United States Patent [19]

Ou-Yang

[11] Patent Number: 4,684,554

[45] Date of Patent: Aug. 4, 1987

[54] POLYMERIC COATING FOR CONTAINER INDUCTION INNERSEAL

[75] Inventor: David T. Ou-Yang, Cottage Grove, Minn.

[73] Assignee: Minnesota Mining and Manufacturing Company, St. Paul, Minn.

[21] Appl. No.: 722,822

[22] Filed: Apr. 12, 1985

[51] Int. Cl.[4] .............................. B65D 1/02; C09J 7/02
[52] U.S. Cl. ...................................... 428/35; 215/232; 215/341; 215/349; 428/347; 428/348; 428/349; 428/461; 428/467; 428/486; 428/913
[58] Field of Search ................. 428/348, 349, 467, 35, 428/913, 461, 486, 347; 215/349, 341, 232

[56] References Cited

U.S. PATENT DOCUMENTS

| | | | |
|---|---|---|---|
| 3,616,015 | 10/1971 | Kingston | 428/485 X |
| 4,013,188 | 3/1977 | Ray | 215/347 |
| 4,503,123 | 3/1985 | Ou-Yang | 428/349 |
| 4,536,434 | 8/1985 | Magnotta | 428/348 X |

Primary Examiner—Thomas J. Herbert
Attorney, Agent, or Firm—Donald M. Sell; James A. Smith; David L. Weinstein

[57] ABSTRACT

Tamper-resistant inner seals that bond firmly to the lips of lidded and capped glass and plastic containers. The innerseals incorporate a metallic foil having a heat sealable adhesive applied to one surface thereof. The heat-sealable adhesive comprises a parafin wax or blend of paraffin wax and microcrystalline wax, polystyrene or derivative thereof, rosin or derivative thereof, and at least one high molecular weight polymeric material selected from the group consisting of ethylene/acrylic acid copolymers, ethylene/vinyl acetate copolymers, ethylene/methacrylate copolymers, and ethylene/vinyl acetate/methacrylic acid terpolymers, and blends thereof.

12 Claims, 4 Drawing Figures

POLYMERIC COATING FOR CONTAINER INDUCTION INNERSEAL

TECHNICAL FIELD

This invention relates to a polymeric composition which can be utilized to prepare a seal for the opening of a container, such as a bottle, which utilizes a conventional screw cap or snap cap closure. More specifically, the polymeric composition can be utilized in conjunction with other components to provide a seal over the container opening by means of induction heating.

BACKGROUND ART

Containers for the dispensing of consumer products such as medicines, foods, etc. which utilize screw top and snap cap closures, are typically sealed to prevent tampering with the goods therein prior to ultimate purchase by the consumer. Over the past few years, and especially in the United States, such tampering with goods has occurred, resulting in injury, often severe, and in some cases, even death. Accordingly, it has become apparent that more effective systems for the sealing of such containers are necessary.

One system which has met with significant commercial success bears the trademark "Safe-Gard". This system provides a hermetic seal that is suitable for use with ingestible commodities. The seal is particularly effective for products which should preferably be kept free from contamination, oxidation, and/or moisture.

The seal employed in the "Safe-Gard" system typically comprises in order from top to bottom: a pulp board backing, a wax coating, aluminum foil, and a heat sealable polymeric film coating. These materials are typically supplied in strip form as a laminated structure, and applied to a strip form as a laminated structure, and applied to a filled container in conventional fashion during the filling process. After being capped, the filled container is passed through an electromagnetic field generated by induction heating equipment, which heats the outer edge of the aluminum foil, thereby bringing about the melting of the heat sealable polymeric film coating. After the container is removed from the induction field, the heat sealable coating will cool and the foil will be hermetically sealed to the lip of the container. During the induction heating step, the wax coating between the foil and pulpboard backing also melts, destroying the bond therebetween. While the wax remains in a molten state for a short period of time, it is wicked up or absorbed by the pulpboard backing such that the wax bond is permanently weakened. Upon removal of the cap from the container, the pulp backing remains with the cap's inner surface, which contacts and seals the lip of the container after the foil liner has been removed by the consumer.

It has been found that the heat sealable polymeric film coating presently utilized in the container industry has a relatively weak bond to containers currently used in high speed container-filling industries, such as the food industry. Furthermore, it has been found that the commercially available heat sealable polymeric film coatings or adhesives can be ineffective for use with various container materials in the induction innerseal system. For example, while an adhesive may be highly effective for polyethylene containers, it may be relatively ineffective with other conventional plastic containers, such as polystyrene or polypropylene. Furthermore, while an adhesive may be effective for plastic containers, it may be ineffective for glass containers. Additionally, most commercially available adhesives useful in induction innerseal systems are not useful for containers having metal caps, because these caps dissipate much of the energy available for sealing the adhesive.

It has now been discovered that the polymeric composition of this invention, when utilized in an induction-activated innerseal system, will provide a strong, heat-sealed bond on glass containers and most popular plastic containers, such as polystyrene, polyethylene, polypropylene, polyvinyl chloride, etc., regardless of whether the container has a plastic cap or a metal cap.

SUMMARY OF THE INVENTION

This invention involves a heat sealable polymeric composition for use in conjunction with other elements to provide an innerseal on the open mouth of containers. The composition comprises from about 5 to about 27 percent by weight of a paraffin wax or a blend of paraffin wax and microcrystalline wax; from about 3 to about 50 percent by weight of polystyrene or derivative thereof; from about 5 to about 45 percent by weight of rosin or derivative thereof; from about 30 to about 65 percent by weight of at least one high molecular weight polymeric material selected from the group consisting ethylene/acrylic acid copolymers, ethylene/vinyl acetate copolymers, ethylene/methacrylate copolymers, and ethylene/vinyl acetate/methacrylic acid terpolymers, and blends thereof. If a blend of paraffin wax and microcrystalline wax is employed, the wax blend should contain no more than about 50% by weight microcrystalline wax, with the melting point of the microcrystalline wax being no more than about 85° C.

The heat sealable polymeric composition is useful for preparing innerseals that are bonded by induction heating. These innerseals can be used with both glass and plastic containers, and the polymeric composition makes it possible to use induction heating with metal caps as well as plastic caps.

BRIEF DESCRIPTION OF THE DRAWINGS

Understanding of the invention will be enhanced by referring to the accompanying drawing, in which like numbers refer to like parts in the several views and in which.

DETAILED DESCRIPTION

Figure 1:
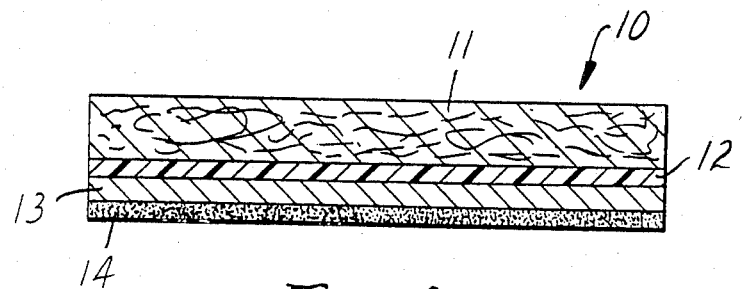
FIG. 1 is a greatly enlarged cross section of the inner seal made in accordance with the invention.

The basic elements of an innerseal system 10 for containers based on induction heating comprise a pulpboard backing 11, a layer 12 of wax coated thereover, a metallic foil 13, preferably aluminum, applied over the wax, and a polymeric film 14 coated over the foil capable of providing a heat sealed bond. The pulpboard backing 11, wax layer 12, metallic foil 13, and heat sealable polymeric film 14 are all coextensive. In addition, there may be other layers of materials, such as polyethylene terephthalate, polyvinylidene chloride, ethylene/vinyl acetate, and the like, interposed between the heat sealable polymeric film and the metallic foil to heighten particular characteristics, such as, for example a vapor barrier. Also, there may be a film, e.g., paper, interposed between the heat sealable polymeric film and the metallic foil to provide for increased adhesion, to increase the ability to detect tampering, to increase web rigidity for ease of handling during coating operations, or for other purposes.

In some instances, a pulpboard material may already be included within the container cap to conform to irregularities in the container opening. In this instance, the wax layer and the pulpboard backing may be unnecessary. Furthermore, if resealability is unnecessary, as for example with a snap cap closure, these elements again may be omitted. However, the rigidity of the web is preferably maintained sufficiently high for disc punching, web handling, and related manufacturing operations.

The basic construction of a web for induction sealing of containers typically comprises as a first element a paper pulpboard backing 11 which need not be greater than about 1500 micrometers thick, and is preferably between about 125 and about 1000 micrometers thick. An example thereof is 875 micrometer white lined pulpboard.

The second element, applied over the pulpboard backing 11, is a wax layer 12, typically less than about 100 micrometers thick, and preferably about 25 micrometers thick. An example of a commercially available wax suitable for the wax layer 12 is $B^2$-175 microcrystalline wax, commercially available from Bareco.

The third element is a metallic foil 13, preferably aluminum. The foil 13 need not be greater than about 75 micrometers thick, and preferably is from about 5 to about 37.5 micrometers thick. An example thereof is 1145-0 aluminum foil commercially available from Alcoa.

The fourth element is, of course, the heat sealable polymeric film 14 of this invention which need not be greater than about 150 micrometers thick, and is preferably from about 12.5 to about 62.5 micrometers thick.

As discussed earlier, other layers of materials can be added to enhance desired properties, and if resealability of the container is not necessary, the pulpboard backing 11 and wax layer 12 are not required.

The first component necessary for preparation of the composition for the heat sealable polymeric film 14 of the invention is paraffin wax. Other waxes, such as microcrystalline waxes, can be blended with the paraffin wax. The melting point of the paraffin wax, determined pursuant ASTM D-127, is preferably from about 44° C. to about 72° C. At melting points lower than about 44° C., the coating formed from the composition may tend to block, while a melting point of greater than about 72° C. may reduce adhesion. If a microcrystalline wax is blended with the paraffin wax, the melting point of the microcrystalline wax is preferably below 85° C. If the melting point is in excess of 85° C., adhesion may be adversely affected. If a microcrystalline wax/paraffin wax blend is employed, the concentration of microcrystalline wax should not exceed 50 percent by weight of the wax component. A higher concentration of microcrystalline wax may adversely affect adhesion. The paraffin wax or blend containing paraffin wax should be present at from about 5 percent to about 27 percent by weight of the polymeric composition, and more preferably between about 7 percent and about 20 percent by weight. Below about 5 percent, there is a tendency for blocking, and at greater than about 27 percent, adhesion between the heat sealed composition and the container is too low, thereby minimizing the ability to detect tampering. The functions of the paraffin wax are to improve the melt flowability of the polymeric composition during the process of coating, to improve adhesion to bottles, particularly glass, to avoid blocking to the pulp board backing during storage and shipment, and to improve machine handling ability of the innerseal system. Because paraffin wax will melt at 165° F. (74° C.) or lower, and its viscosity is very low at coating temperatures of 250° to 330° F. (121° C. to 165° C.), its presence in the polymeric composition helps to improve the efficiency of the coating process. The lubricating characteristics of paraffin wax also help reduce or prevent gumming and fouling of the dies employed in stamping the innerseals.

Representative examples of commercially available paraffin waxes having utility herein include P-127, P-137, P-167, P-155 (commercially available from Sun Oil Company), Shellwax ® 200, Shellwax ® 270 (commercially available from Shell Chemical Co.), paraffin 133/135 (commercially available from Quaker State Oil Co.). Representative examples of microcrystalline waxes having utility herein include $B^2$-175, $B^2$-185 (commercially available from Bareco), "Multiwax" W-835 (commercially available from Witco Chemical Co.)

The second component of the polymeric composition is low molecular weight polystyrene or derivatives thereof. Examples of acceptable derivatives include polymeric materials such as alpha-methyl styrene and vinyl toluene/alpha-methyl styrene. The functions of the polystyrene are to improve adhesion and to reduce blocking. The polystyrene or derivative thereof should have a softening temperature, as determined by the conventional ring and ball test, of at least about 75° C., and preferably at least 100° C. At a softening temperature of less than about 75° C., the coating formed from the composition may tend to block.

The polystyrene or derivative thereof should be present at from about 3 to about 50 percent by weight of the polymeric composition, with from about 16 to about 42 percent by weight being preferred. At less than about 3 percent, adhesion may be reduced and the composition may not be suitable for glass containers and certain plastic containers, e.g. styrene. At greater than about 50 percent, the adhesive may tend to block and adhesion is reduced.

Examples of commercially available polystyrene or derivatives thereof include the "Piccolastic" series of polystyrene and modified polystyrene compounds, specific examples being A-75, D-75, E-100, etc. Further examples include the "Kristalex" series of polymeric alpha-methyl styrene, such as 3085, 1120, etc.; the "Piccotex" series of polymeric vinyl toluene/alpha-methyl styrene compounds such as 75, LC, 100, etc.; and the "Piccoflex" series of styrene/acrylonitrile copolymeric materials such as 100, 110, 120, etc. All of the foregoing polystyrene materials are manufactured by Hercules, Inc.

The third component of the polymeric composition is at least one copolymer selected from the group consisting of ethylene/acrylic acid copolymers, ethylene/vinyl acetate copolymers, ethylene/methacrylate copolymers ethylene/vinyl acetate/methacrylic acid terpolymers, and blends thereof. The functions of this ingredient are to promote adhesion, to increase the strength and flexibility of the polymeric coating, and to act as a matrix to form a smooth, flexible coating surface.

Ethylene/acrylic acid copolymers having utility herein include those having an acrylic acid content of from between about 3 to about 20 percent by weight and preferably from about 6 to about 13 percent by weight, and a melt index equal to or greater than about 2.5 grams per 10 minutes. Commercially available examples of such materials include EAA-459, EAA-435, manufactured by Dow Chemical Co.

Ethylene/methacrylate copolymers having utility herein are those containing approximately 80 percent by weight ethylene and approximately 20 percent by weight methacrylate, and having a melt index equal to or less than about 600 grams per 10 minutes. A commercially available example of such a material is EMA-2205 manufactured by Gulf Oil Corporation.

Ethylene/vinyl acetate copolymers having utility herein include those wherein the vinyl acetate content is from about 8 to about 66 percent by weight, with from about 15 to about 43 percent by weight being preferred, and a melt index equal to or greater than about 1.5 grams per 10 minutes, and preferably from about 8 to about 600 grams per 10 minutes. Examples of commercially available ethylene/vinyl acetate copolymers include "Elvax" 410, "Elvax" 210, "Elvax" 150, etc. manufactured by E. I. duPont de Nemours, Inc., and "Ultrathene" UE-632, manufactured by U.S. Industrial Chemical.

Ethylene/vinyl acetate/methacrylic acid terpolymers having utility herein include those wherein the vinyl acetate content is between about 24 and about 30 percent by weight, and the melt index thereof being equal to or less than about 600 grams per 10 minutes with a melt index from about 60 to about 470 grams per 10 minutes being preferred. Examples of commercially available ethylene/vinyl acetate/methacrylic acid terpolymers include "Elvax" 4310, "Elvax" 4320, etc., manufactured by E. I. duPont de Nemours, Inc.

If the melt index of the high molecular weight copolymer is too low, incompatibility of the ingredients may result, causing poor adhesion. Excessive melt indices may reduce the cohesive strength of the composition such that the tamper-indicating properties of the coating may be unacceptable.

If the vinyl acetate content of the copolymers or terpolymers noted above is too low, the adhesion of the composition to the overlying metallic foil will be reduced, again reducing the tamper indicating properties thereof. Excessive vinyl acetate content may tend to cause the coating to block.

The concentration of the high molecular weight copolymer component should be from about 30 to about 65 percent by weight of the polymeric composition with from about 30 to about 60 percent by weight being preferred. At less than about 30 percent, the cohesive strength may be reduced below an acceptable level, and at greater than about 65 percent, adhesion is unacceptable.

The fourth component necessary for the polymeric composition includes rosin or derivative thereof, e.g, rosin ester, having a softening point as measured by the ring and ball method of at least about 70° C., preferably from about 70° C. to about 105° C. The function of the rosin or its derivative is to improve the adhesion of the polymeric composition to the surface of the container and to improve the melt flowability of the adhesive during the coating process. If no rosin or rosin derivative is employed, the adhesion of the polymeric composition is poor and the composition may not adhere to certain container materials. If the softening point of the rosin ester is greater than 105° C., the degree of adhesion will decrease. The concentration of the rosin or its derivative should be from about 5 to about 45 percent by weight with from about 10 to about 21 percent by weight being preferred. Representative examples of commercially available rosin derivatives include "Foral" Ax (dehydrogenated rosin), "Foral" 85 (glycerol ester of hydrogenated rosin), and "Foral" 105 (pentaerythritol ester of hydrogenated rosin), all of which are manufactured by Hercules, Inc.

A fifth component that can be added to the polymeric composition is a chlorinated polyolefin, e.g., chlorinated polyethylene, chlorinated polypropylene, chlorinated polybutylene, and mixtures thereof. Chlorinated polyolefin will help increase the adhesion of the polymeric composition to surfaces made of polypropylene. However, it tends to degrade easily during the hot melt compounding, hot melt coating, and heat sealing process. Accordingly, no more than 18 percent by weight and preferably, no more than 10 percent by weight chlorinated polyolefin should be included in the composition when it is employed. Representative examples of commercially available chlorinated polyolefins include Eastman ® CP-343-1, available from Eastman Chemical Products, Inc., and "Hardlen" 13-LP, available from Toyo Kasei Kogyo Co., Ltd.

The heat sealable polymeric coating can be compounded by utilizing conventional high pressure steam heated glass-lined or stainless steel kettles or oil heated stainless steel kettles for melting and mixing components.

Application of the polymeric coating 14 to the metallic foil substrate 13 can be undertaken by conventional techniques, including extrusion and other hot melt coating techniques. Coating weights of the polymeric material should be at least about six grams per square meter. Preferably, the coating weights are from about 19 to about 45 grams per square meter.

To prepare a web 10 for innerseal applications, a metallic foil 13, or paper-backed metallic foil 13, is obtained directly from vendors. If desired, a film, e.g. polyester, can be conveniently applied to foil 13 via conventional technques, e.g., gravure roll coating. Polyester is resistant to high temperatures and provides an excellent vapor barrier, two characteristics frequently requested by packagers. The polymeric composition 14 of the invention can then be hot melt coated onto metallic foil 13 (or onto the paper or film coating thereon, if present) again using conventional techniques. The remaining surface of metallic foil 13 can then be roll-coated with microcrystalline wax and cooled. The wax-coated surface can then be placed in contact with the surface of a pulpboard sheet and passed through squeeze rolls at elevated temperature, thereby laminating foil 13 to pulpboard backing 11 while leaving heat-sealable layer 14 exposed. The resulting inner seal construction can then be slit to suitable widths, from which circular discs, corresponding to the inner diameter of screw-on lids, can be die cut.

As is well known in the inner seal art, the combination of the various sheets and foils in the foregoing embodiment represents only one specific construction. To illustrate, the foil may be prelaminated to a sheet of paper, the pulpboard may be prelaminated to a polyester film, etc.

Figure 4:
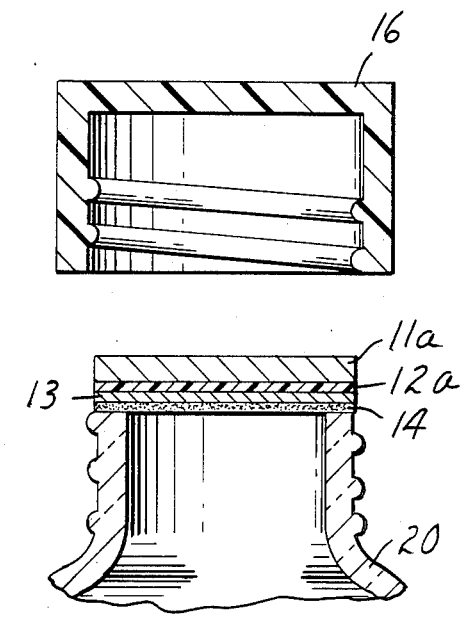
FIG. 4 is similar to FIG. 3 but shows the result of using a pressure-sensitive adhesive in lieu of the microcrystalline wax layer and a paper backing in lieu of a pulpboard backing.

In an alternative construction, pulpboard backing 11 can be replaced with a backing 11a made from paper, chipboard, polymeric foam, or the like, and microcrystalline wax layer 12 can be replaced by a layer 12a of an adhesive, e.g., pressure-sensitive adhesive. This adhesive exhibits sufficient adhesive strength to permanently bond backing 11a to foil 13. An example of this construction is shown in FIG. 4.

Figures 2, 3:
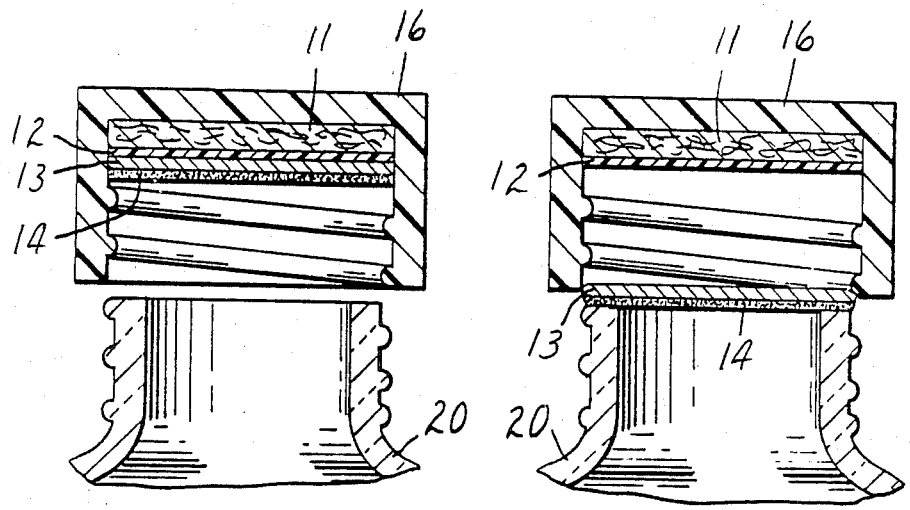
FIG. 2 is a cross sectional view of a screw-on cap having a circle of the product of FIG. 1 bonded to the lower surface of the cap, which is positioned above a container (only the upper portion of which is shown) prior to installing the cap on the mouth of the container.
FIG. 3 is similar to FIG. 2 but shows the result of heat sealing the mouth of the container and subsequently removing the cap.

FIG. 2 shows composite innerseal 10 mounted inside screw-on top 16. After container 20 has been filled cap 16 is screwed into the mouth of container 20, after which the capped container is passed through a radio frequency field, the resulting eddy currents inductively heating metal foil 13 and simultaneously melting wax layer 12 and heat-sealable adhesive layer 14. As wax 12 melts, it is absorbed by pulpboard backing 11, greatly weakening the bond between backing 11 and metal foil 13. As the capped container cools to room temperature, heat-sealable adhesive 14 bonds firmly to the lip of container 20. When cap 16 is subsequently unscrewed from container 20, pulpboard backing 11 twists free from foil 13, which remains firmly bonded to the lip of container 20 by means of heat-sealable adhesive 14, whereby providing a tight seal which prevents leakage. Because foil 13 tears when subjected to peeling forces, it also provides an indication that tampering may have occurred.

The heat sealable polymeric film coating of this invention provides a stronger bond to containers than do conventional heat sealable polymeric film coatings. The polymeric film is also universally effective in that it is useful in innerseals for both glass and plastic containers. Furthermore, the polymeric film is useful for induction innerseal systems using either plastic caps or metal caps. Even though metal caps dissipate much of the energy available for sealing the polymeric film to the lip of the container, the heat scalable polymeric film of this invention provides sufficient adhesive strength to render it useful for induction innerseal systems employing these caps.

The invention will now be more fully described by the following non-limiting examples, wherein all parts are by weight unless otherwise specified.

In each example, the innerseal comprised (1) an 875 micrometer white line pulpboard backing, (2) a layer of microcrystalline wax having a thickness of about 25 micrometers, (3) an aluminum foil (Alcoa 1145-0) having a thickness of 1 mil, and (4) a heat sealable polymeric film containing paraffin wax, rosin derivative, polystyrene, and ethylene copolymer. In the primary examples, the concentration of each ingredient in the heat sealable polymeric film was within the acceptable ranges. In the comparative examples, the concentration of some of the ingredients in the heat sealable composition was outside of the acceptable ranges.

In each example, a determination of the adhesion characteristics to specific containers is made by manual testing, i.e., the foil is attempted to be hand peeled from the edges of the container opening where the seal should be effective.

EXAMPLES 1-2

To a glass jar was first added the paraffin wax or wax blend. The temperature of the composition in thc jar was maintained between 280° F. and 320° F. As the wax was melting, the polystyrene derivative was added to the jar, followed by the rosin derivative, and then the ethylene copolymer. During the addition of the ingredients, the contents of the jar were stirred so that the resulting composition would be homogeneous. The following table sets forth the ingredients, trade names, and amounts thereof for each working example (1,2) and for five comparative examples (A, B, C, D, E). All amounts are in parts by weight.

TABLE I

| Ingredient | 1 | 2 | Comparative A | Comparative B | Comparative C | Comparative D | Comparative E |
|---|---|---|---|---|---|---|---|
| Paraffin Wax |  |  |  |  |  |  |  |
| P-137 | 14.3 | 10.0 | 12.6 |  | 14.3 | 40.0 |  |
| Microcrystalline wax |  |  |  |  |  |  |  |
| Multiwax W-835 |  | 4.3 |  |  |  |  |  |
| B²-175 |  |  |  | 14.3 |  |  |  |
| Polystyrene |  |  |  |  |  |  |  |
| Kristalex 1120 | 28.6 |  | 6.3 | 28.6 | 28.6 | 10.0 | 33.3 |
| Kristalex 3100 |  | 28.6 |  |  |  |  |  |
| Rosin derivative |  |  |  |  |  |  |  |
| Foral AX | 14.3 |  | 6.3 | 14.3 |  | 7.1 | 16.6 |
| Foral 85 |  | 14.3 |  |  |  |  |  |
| Polyterpene derivative |  |  |  |  |  |  |  |
| Zonarez B-70[1] |  |  |  |  | 14.3 |  |  |
| Ethylene copolymer |  |  |  |  |  |  |  |
| Elvax 4320 | 42.8 |  | 75.0 | 42.8 |  |  |  |
| Elvax 310 |  | 42.8 |  |  |  |  |  |
| Elvax 4355 |  |  |  |  | 42.8 |  |  |
| Elvax 4310 |  |  |  |  |  | 35.7 |  |
| EAA 409 |  |  |  |  |  | 7.2 |  |
| Elvax 260 |  |  |  |  |  |  | 50.0 |

[1]Zonarez B-70 is commercially available from Arizona Chemical Company.

Each heat-sealable adhesive composition was then hot melt coated on one face of 25-micrometer aluminum foil in an amount equal to approximately 30 g/m².

As is conventional, the other face of the aluminum foil was then roll coated with molten (95° C.) microcrystalline wax and cooled, leaving a coating weight of about 7.5 mg/in². The wax-coated surface was then placed in contact with the surface of a pulpboard sheet and passed through squeeze rolls at a temperature of 55° C., thereby laminating the aluminum foil to the pulpboard while leaving the heat-sealable adhesive layer exposed. The innerseal was then tested for blocking. To pass the blocking test, no adhesive can transfer to the pulpboard backing and no pulpboard fiber can transfer to the adhesive when the adhesive is placed in contact with the pulpboard backing. The resultant inner seal construction was then slit to suitable widths, from which circular discs, corresponding to the inner diameter of screw-on lids, were die-cut. A suitable adhesive was then employed, in conventional manner, to bond the pulpboard face of one of these discs to the inner surface of the screw-on cap for a glass jar.

The lid was screwed onto a glass jar using appropriate torque; for example, with a glass jar having a 38-mm inside diameter. The jar was then passed through a radio frequency field adjacent the lid for about 0.7–1.0 second, which was sufficient to bond the aluminum foil to the lip, simultaneously melting the microcrystalline wax, which diffused into the pulpboard and weakened the bond between the foil and the pulpboard. The sealed jar was then cooled to room temperature. The seals were then tested for tamper-indicating ability. To pass the tamper-indicating test, at least 50% of the innerseal material must remain on the lip of the jar when the cap is unscrewed. The heat-sealable compositions of Examples 1 and 2 passed both tests. The compositions of Comparative Examples A, B, C and D failed the tamper-indicating test. The composition of Comparative Example E failed the blocking test.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An article suitable for preparing a container innerseal comprising a pulpboard backing, a layer of wax coated over said backing, metallic foil overlying said wax layer, and a layer of a polymeric composition consisting essentially of from about 5 to about 27 percent by weight of paraffin wax or blend of paraffin wax and microcrystalline wax, from about 3 to about 50 percent by weight of polystyrene or derivative thereof having a softening temperature of at least about 75° C., from about 5 to about 45 percent by weight of rosin or derivative thereof having a softening temperature of at least about 70° C., and from about 30 to about 65 percent by weight of at least one high molecular weight polymeric material selected from the group consisting of ethylene/acrylic acid copolymers having an acrylic acid content of from about 3 to about 20 percent by weight and a melt index equal to or greater than about 2.5 grams per 10 minutes, ethylene/vinyl acetate copolymers having a vinyl acetate content of from about 8 to about 66 percent by weight and a melt index equal to or greater than about 1.5 grams per 10 minutes, ethylene/methacrylate copolymers containing approximately 80 percent by weight ethylene and approximately 20 percent by weight methacrylate and having a melt index equal to or less than about 600 grams per 10 minutes, and ethylene/vinyl acetate/methacrylic acid terpolymers having a vinyl acetate content between about 24 and about 30 percent by weight and melt index being equal to or less than about 600 grams per 10 minutes coated over said metallic foil.

2. The article of claim 1 wherein the metallic foil comprises aluminum.

3. The article of claim 1 wherein the layer of wax coated over said backing comprises microcrystalline wax.

4. A container innerseal comprising a pulpboard backing, a layer of wax coated over said backing, metallic foil overlying said wax layer, and a polymeric layer coated over said metallic foil, said polymeric layer formed from a polymeric composition consisting essentially of from about 5 to about 27 percent by weight of paraffin wax or blend of paraffin wax and microcrystalline wax, from about 3 to about 50 percent by weight of polystyrene or derivative thereof having a softening temperature of at least about 75° C., from about 5 to about 45 percent by weight of rosin or derivative thereof having a softening temperature of at least about 70° C., and from about 30 to about 65 percent by weight of at least one high molecular weight polymeric material selected from the group consisting of ethylene/acrylic acid copolymers having an acrylic acid content of from about 3 to about 20 percent by weight and a melt index equal to or greater than about 2.5 grams per 10 minutes, ethylene/vinyl acetate copolymers having a vinyl acetate content of from about 8 to about 66 percent by weight and a melt index equal to or greater than about 1.5 grams per 10 minutes, ethylene/methacrylate copolymers containing approximtely 80 percent by weight ethylene and approximately 20 percent by weight methacrylate and having a melt index equal to or less than about 600 grams per 10 minutes, and ethylene/vinyl acetate/methacrylic acid terpolymers having a vinyl acetate content between about 24 and about 30 percent by weight and melt index being equal to or less than about 600 grams per 10 minutes.

5. A container comprising the innerseal of claim 4.

6. The article of claim 4 wherein the metallic foil comprises aluminum.

7. The article of claim 4 wherein the layer of wax coated over said backing comprises microcrystalline wax.

8. An article suitable for preparing a container innerseal comprising a backing, a layer of adhesive coated over said backing, metallic foil overlying said adhesive layer, and a layer of a polymeric composition consisting essentially of from about 5 to about 27 percent by weight of paraffin wax or blend of paraffin wax and microcrystalline wax, from about 3 to about 50 percent by weight of polystyrene or derivative thereof having a softening temperature of at least about 75° C., from about 5 to about 45 percent by weight of rosin or derivative thereof having a softening temperature of at least about 70° C., and from about 30 to about 65 percent by weight of at least one high molecular weight polymeric material selected from the group consisting of ethylene/acrylic acid copolymers having an acrylic acid content of from about 3 to about 20 percent by weight and a melt index equal to or greater than about 2.5 grams per 10 minutes, ethylene/vinyl acetate copolymers having a vinyl acetate content of from about 8 to about 66 percent by weight and a melt index equal to or greater than about 1.5 grams per 10 minutes, ethylene/methacrylate copolymers containing approximately 80 percent by weight ethylene and approximately 20 percent by weight methacrylate and having a melt index equal to or less than about 600 grams per 10 minutes, and ethylene/vinyl acetate/methacrylic acid terpolymers having a vinyl acetate content between about 24 and about 30 percent by weight and melt index being equal to or less than about 600 grams per 10 minutes coated over said metallic foil.

9. The article of claim 8 wherein the metallic foil comprises aluminum.

10. A container innerseal comprising a backing, a layer of adhesive coated over said backing, metallic foil overlying said adhesive layer, and a polymeric layer coated over said metallic foil, said polymeric layer formed from a polymeric composition consisting essentially of from about 5 to about 27 percent by weight of paraffin wax or blend of paraffin wax and microcrystalline wax, from about 3 to about 50 percent by weight of polystyrene or derivative thereof having a softening temperature of at least about 75° C., from about 5 to about 45 percent by weight of rosin or derivative thereof having a softening temperature of at least about 70° C., and from about 30 to about 65 percent by weiqht of at least one high molecular weight polymeric material selected from the group consisting of ethylene/acrylic acid copolymers having an acrylic acid content of from about 3 to about 20 percent by weight and a melt index equal to or greater than about 2.5 grams per 10 minutes, ethylene/vinyl acetate copolymers having a vinyl acetate content of from about 8 to about 66 percent by weight and a melt index equal to or greater than about 1.5 grams per 10 minutes, ethylene/methacrylate copolymers containing approximately 80 percent by weight ethylene and approximately 20 percent by weight methacrylate and having a melt index equal to or less than about 600 grams per 10 minutes, and ethylene/vinyl acetate/methacrylic acid terpolymers having a vinyl acetate content between about 24 and about 30 percent by weight and melt index being equal to or less than about 600 grams per 10 minutes.

11. The article of claim 10 wherein the metallic foil comprises aluminum.

12. A container comprising the innerseal of claim 10.

* * * * *

UNITED STATES PATENT AND TRADEMARK OFFICE
CERTIFICATE OF CORRECTION

PATENT NO. : 4,684,554
DATED     : August 4, 1987
INVENTOR(S) : David T. Ou-Yang It is certified that error appears in the above-identified patent and that said Letters Patent is hereby corrected as shown below:

Front page Abstract, line 6    "parafin" should be --paraffin--

Col. 1, line 36, delete "and applied to a strip form as a laminated structure".

Col. 6, line 50    "pcr" should be --per--

Col. 6, line 56    "temperaturcs" should be --temperatures--

Col. 9, line 46    "of-paraffin" should be --of paraffin--

Signed and Sealed this

Twenty-sixth Day of January, 1988

Attest:

DONALD J. QUIGG

Attesting Officer            Commissioner of Patents and Trademarks